April 26, 1960 R. SARDESON ET AL 2,934,000
MACHINE FOR PROCESSING FILMS
Filed Jan. 13, 1958 7 Sheets-Sheet 6

INVENTOR.
ROBERT SARDESON
BY CLAIRE MILLER
Reif & Gregory
ATTORNEYS

United States Patent Office 2,934,000
Patented Apr. 26, 1960

2,934,000

MACHINE FOR PROCESSING FILMS

Robert Sardeson and Claire Miller, Minneapolis, Minn., assignors to Pako Corporation, Minneapolis, Minn., a corporation of Delaware Application January 13, 1958, Serial No. 708,506

4 Claims. (Cl. 95—89)

This invention relates to a machine for processing photographic films. As is well known, such films after being exposed are first put into a developing solution and then being put into a short stop solution. The film is then placed in a hypo solution and afterwards put in a washing liquid. In modern treatment the film is then usually put in a solution called a wetting agent. The film is successively passed through these solutions at a speed which will give time for the necessary treatment.

It is an object of this invention to provide a machine for processing films which is quite compact, of comparatively short length and one which comprises comparatively few parts.

It is a further object of this invention to provide a machine for processing films, which machine will be suitable for establishments which do not have a large volume of processing work. The compact design of the machine and the fact that it takes comparatively small space make it suitable for such establishments and one which they can afford.

It is another object of this invention to provide a machine in which a plurality of tanks are provided respectively containing the solutions above noted. The machine has means for holding the films and for progressing them through the various solutions above mentioned, together with means for lifting the films from one vessel containing a solution and placing it in the next adjacent vessel.

It is more specifically an object of this invention to provide a machine comprising an elevator bar carrying members from which the films are suspended, said bar being moved through an elongated vertically disposed elliptical path. The films are lifted at one side of this path and lowered at the other so that film can be lifted from one tank and lowered into the next tank.

It is also an object of this invention to provide such a machine as set forth in the preceding paragraph which also comprises a guide means for said elevator bar, said guide means being mounted to move laterally as the elevator bar moves from one side of its path to the other.

It is further an object of this invention to provide a film processing machine comprising an elevator bar which moves through a vertical elongated elliptical path for lifting films from tanks having treating solutions therein and lowering them into an adjacent tank, an endless chain running about upper and lower sprockets secured to said bar for moving the same, a guide bar for said elevator bar, said chain being connected to said elevator bar and said guide bar being mounted for lateral movement as said chain moves about said sprockets.

It is further an object of this invention to provide a machine as set forth in the preceding paragraph, in which said guide bar is mounted on upper and lower parallel arms which are pivoted at some distance from the elevator bar so that said guide bar can swing laterally as the elevator bar moves through the upper and lower portions of its path.

These and other objects and advantages of the invention will be fully set forth in the following description made in connection with the accompanying drawings in which like reference characters refer to similar parts throughout the several views and in which.

Figure 4:
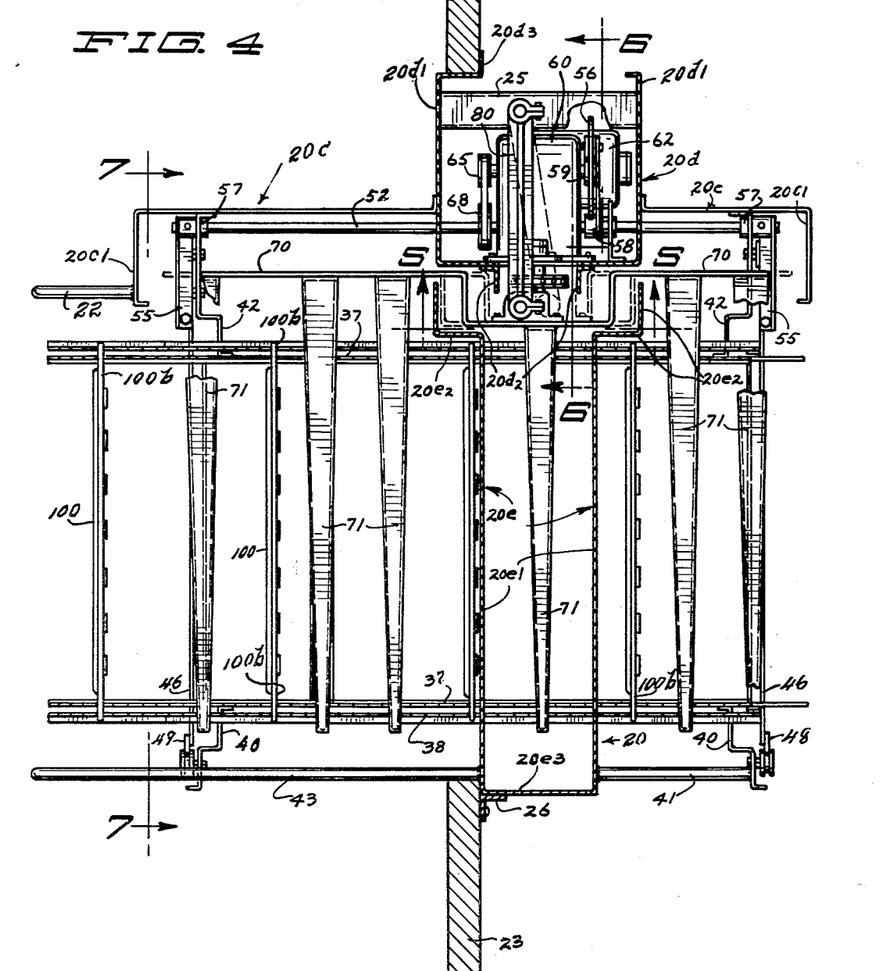
Fig. 4 is a horizontal section taken on line 4—4 of Fig. 1 as indicated by the arrows.
Figure 5:
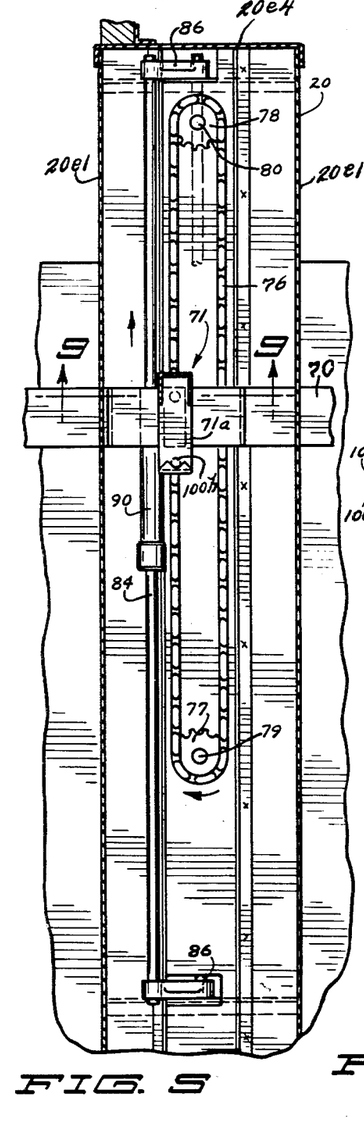
Fig. 5 is a vertical section taken on line 5—5 of Fig. 4 as indicated by the arrows.
Figure 6:
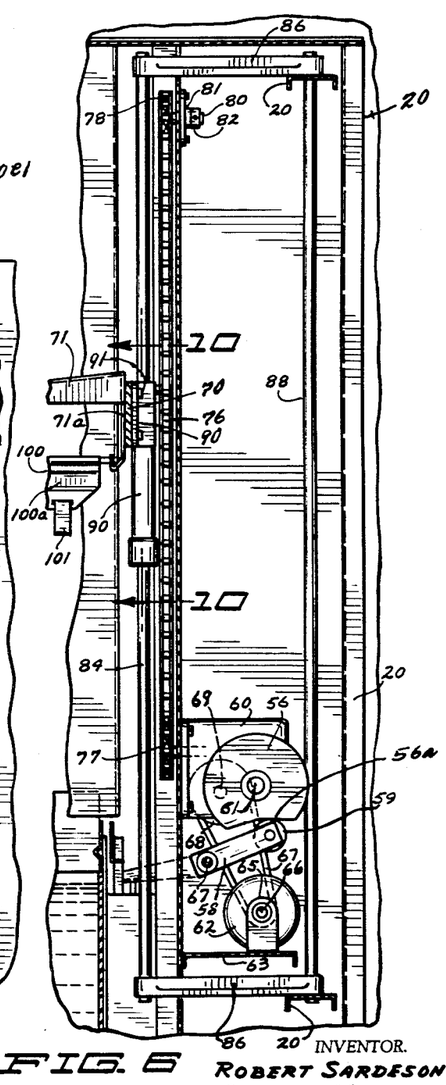
Fig. 6 is a vertical section taken on line 6—6 of Fig. 4 as indicated by the arrows.

Referring to the drawings, a machine is shown having a frame 20 the lower end of which rests upon the support or floor 21. While frame 20 could be variously made, in the embodiment of the invention illustrated, it is as shown in Figs. 4, 5, 6 and 8, shown made of sheet metal. Said frame comprises vertical side portions 20a and horizontal top portions 20b. Frame 20 has a rear wall 20c which has therein a portion 20d comprising spaced channel parts 20d1 facing each other. Said channels have angle portions 20d2 secured thereto at their front sides. One of said channels has a terminal portion 20d3 extending at a right angle to the side of said channel, said portion 20d3 and said side engaging a timber or wall 24 to which they are secured. A channel 25 extends between and is secured to the channels of portion 20d. Said frame also includes a portion 20e having vertically extending parallel side walls 20e1 having parts 20e2 at their rear ends of right angle shape in horizontal cross section. Frame portion 20c has said portions 20c1, one of which at the left as seen in Fig. 4 is connected to a bar 22 shown also in Fig. 4. Side walls 20e1 are connected at their front ends by a part 20e3 which is connected to an angle member 26 secured to a vertical timber or wall 23. Portion 20e extends above the top of rear wall 20c and is covered by a flanged cover member 20e4. See Fig. 1. The portion of space to the left of timber 23 and the left-hand wall 20e1 as seen in Fig. 4, forms a dark room, while the space to the right of said walls is lighted.

Within frame 20 a tank 30 rests upon floor 21. A plurality of tanks, viz: 31, 32, 33, 34 and 35 are disposed in tank 30 and are of considerable height. Tanks 31 to 35 are shown as having flanges 31a, 32a, 33a, 34a and 35a depending at their sides. Said tanks are respectively supported on channel members 28 having horizontal flanges projecting at their upper ends and extending substantially to flanges 31a, 32a, 33a, 34a and 35a respectively. Supply pipes 27 and discharge pipes 26 are shown for each of the tanks 31, 32, 33, 34 and 35. Said tanks 31 to 35 are provided to contain respectively, a developing solution, a short stop solution, hypo, wash water, and a wetting agent.

At each side of the tanks 31 to 35 and a short distance above them is located a toothed bar 37, carried by one or more of the tanks 31 to 35. See Figs. 3 and 4. Said bars have teeth 37a thereon which have one vertical side and the other side inclined to the horizontal somewhat less than 45 degrees. Said teeth on the respective bars 37 are in alinement transversely of the machine. One of the bars 37 has its ends secured respectively to members 40 extending outwardly from bars 37 and having right angle bends therein. One member 40 has its outer end secured to the end of a cylindrical rod 41, the other end of said rod being secured to the side of tank 35. The other member 40 has its outer end secured to a portion of frame 20 and having one end secured to the side of tank 31. The rod 43 extends beyond bars 37 and is reversely bent in a curve and secured to one side 20a of frame 20. Rods 41 and 43 are provided as sort of a guard for toothed bars 37 and 38. The operator can place his hands on rods 41 and 43.

Figure 1:
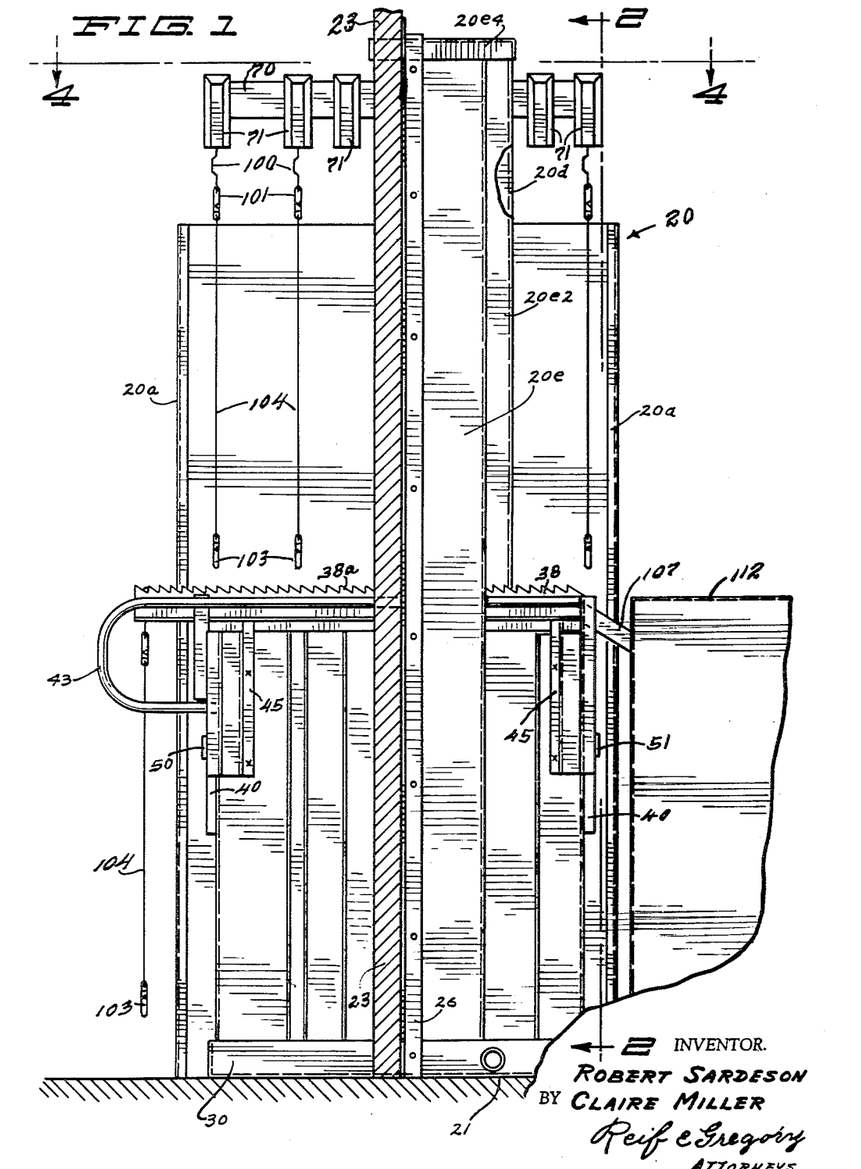
Fig. 1 is a view in side elevation, a wall adjacent the machine being shown in vertical section, some parts being broken away.
Figure 3:
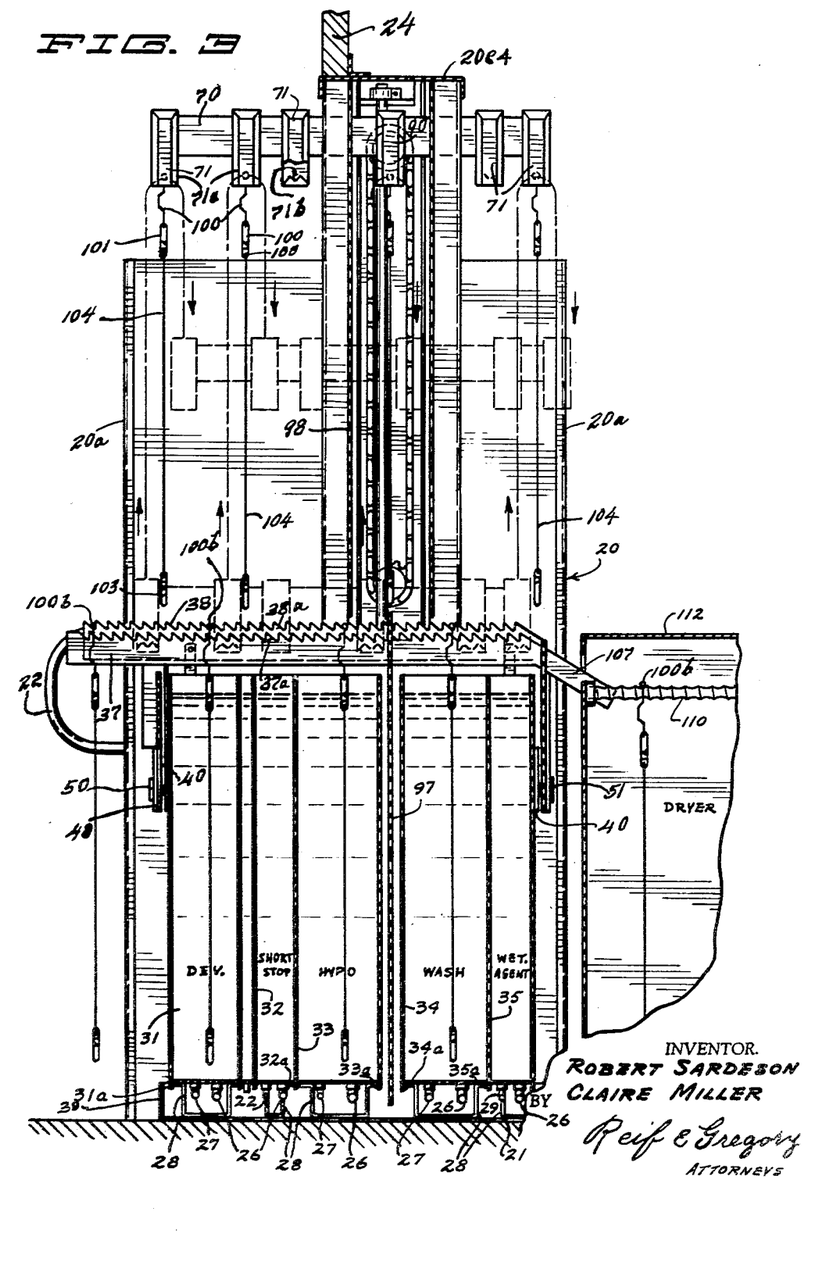
Fig. 3 is a vertical section taken on line 3—3 of Fig. 2 as indicated by the arrows.

A short distance outwardly of each bar 37 is another bar 38 having teeth 38a thereon, the same as teeth 37a. Teeth 37a and 38a are offset somewhat transversely of the machine as shown in Fig. 3. The vertical sides of teeth 37a and 38a are at the left-hand sides of said teeth as seen in Figs. 1 and 3.

Figure 2:
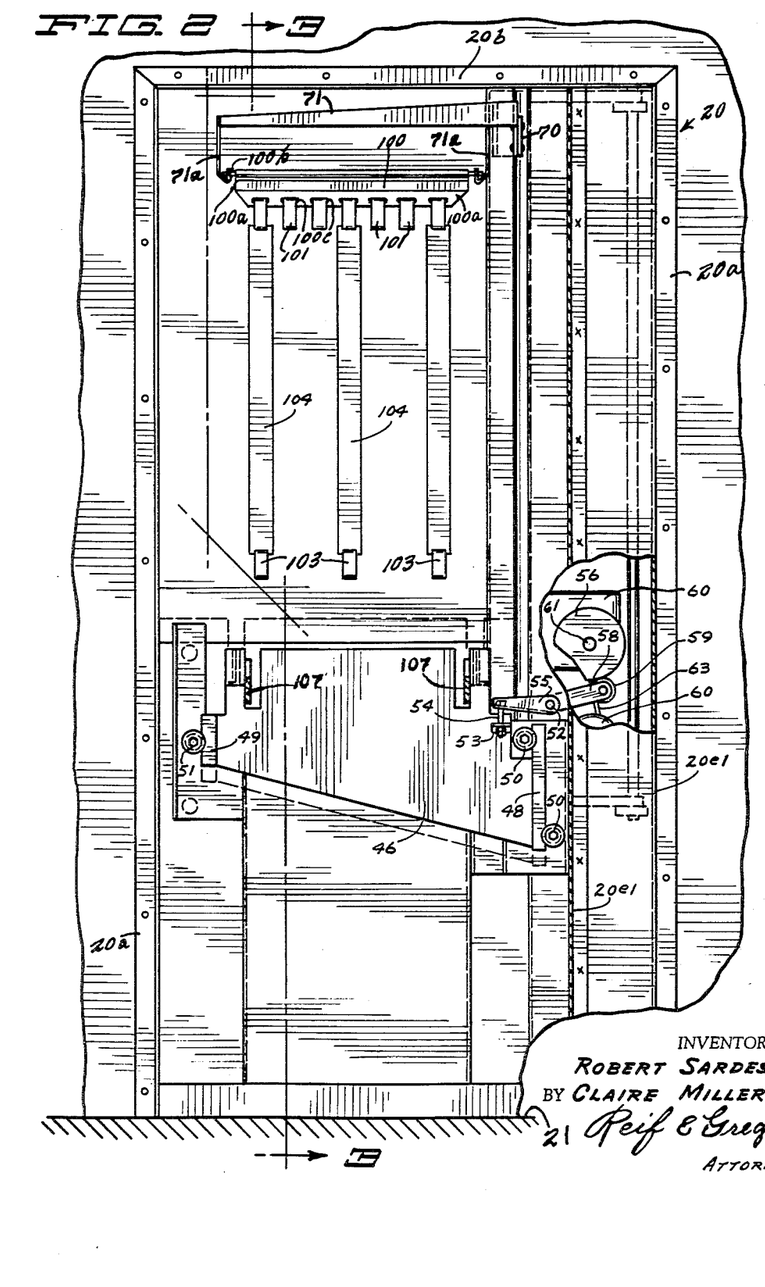
Fig. 2 is a vertical section taken on line 2—2 of Fig. 1 as indicated by the arrows.
Figure 7:
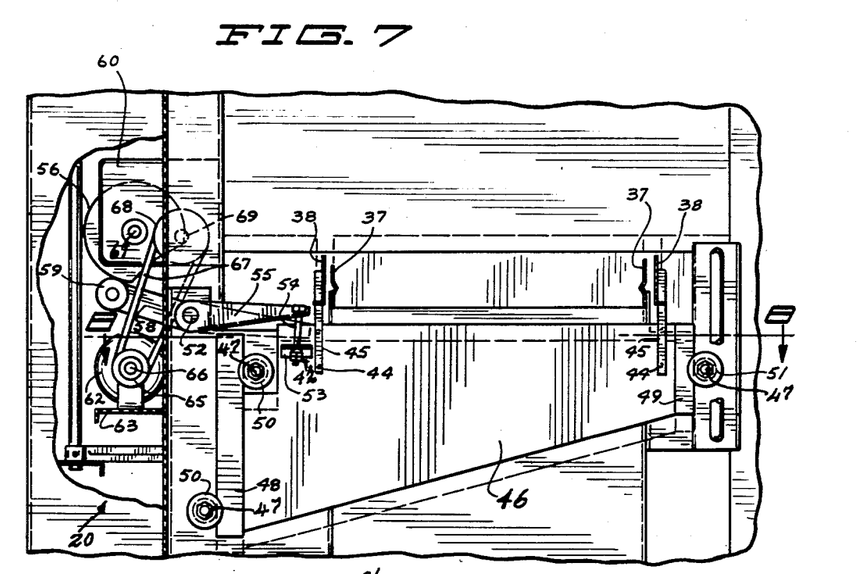
Fig. 7 is a vertical section taken on line 7—7 of Fig. 4 as indicated by the arrows.
Figure 8:
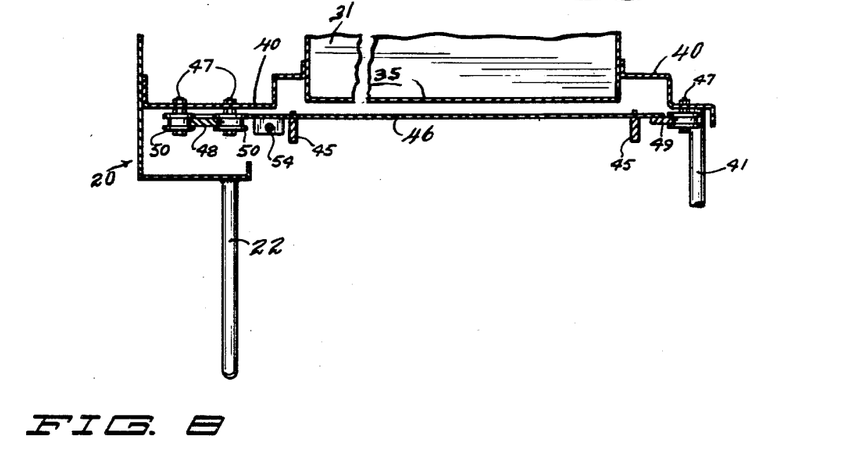
Fig. 8 is a horizontal section taken on line 8—8 of Fig. 7 as indicted by the arrows.
Figure 9:
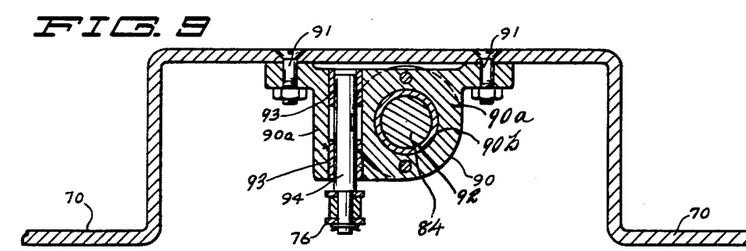
Fig. 9 is a horizontal section taken on line 9—9 of Fig. 10.
Figure 10:
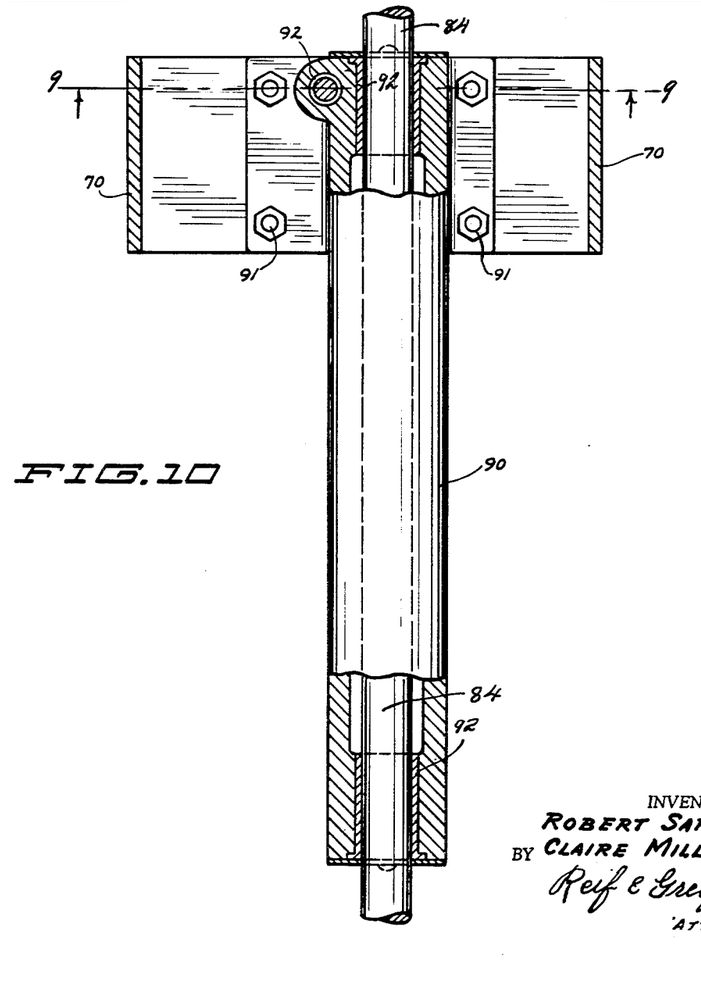
Fig. 10 is a front elevation looking at the lower side of Fig. 9, some parts being shown in vertical section.

The bars 38 are secured at each end respectively to bars or plates 45 disposed adjacent the ends of bars 38. See Figs. 2 and 7. Bars 45 are secured respectively to rather large trapezoidal plates 46 by rivets 44. Plates 46 each have secured thereto vertical spaced bars 48 and 49. Plates 48 have grooved guide rollers 50 at each side thereof, said plates moving in the grooves of rollers 50. Rollers 50 are journaled on headed and nutted studs 47 secured to plates 40. Each plate 49 has a grooved guide roller 51 at one side thereof, said plate moving in the groove of roller 51. Roller 51 is journaled on a headed and nutted stud 47 carried in one of the plates 40. Each plate 46 has secured thereto a small angle bracket 53, through the horizontal portion of which extends a bolt 54 having a head engaging and supported on an arm 55 secured to a shaft 52 and disposed adjacent the end of said arm. Bolt 54 has a pair of nuts 42 thereon below said horizontal portion of bracket 53. The portion of arm 55 adjacent bolt 54 is of U-shape on cross section, or of channel shape, the head of bolt 54 being disposed between the sides of the channel. Arms 55 will thus lift plates 46 as said arms swing upwardly when shaft 52 is rotated. Shaft 52 is journaled in bearings 57 secured to frame portion 20c. See Fig. 4. An arm 58 is secured to shaft 52, the same carrying a cam roller 59 which engages a cam 56. See Figs. 2, 4 and 6. Cam 56 has a low portion 56a in its periphery. Cam 56 is secured to a shaft 61.

A motor 62 is mounted on and secured to a plate 63 secured to one side of frame 20. A pulley 65 is secured to the driving shaft 66 of motor 62 and a belt 67 runs around said pulley and around a pulley 68 secured to a shaft 69 forming part of reducer 60.

An elevator bar 70 is provided adapted to be moved vertically and through an elongated elliptical path for elevating and lowering the films. Bar 70 has secured thereto and extending therefrom a plurality of arms or brackets 71 shown as six in number. See Figures 1, 3 and 4. Each arm 71 is adapted to engage and lift a film hanger. As shown in Fig. 3, each arm 71 has spaced depending members 71a having laterally extending terminal portions provided with a V-shaped recess 71b thereon, which recesses are in alinement longitudinally of arms 71.

Film hangers 100 are provided having a sheet metal upper portion 100a in the upper portion of which a rod 100b is held. Rod 100b projects at each end of portion 100a and is received in the recesses 71b in bracket portions 71a. Portion 100a has spaced slots 100c therein in which are respectively disposed for swinging movement film clips 101. Clips 101 have toothed spring-actuated jaws at their lower ends in which the upper ends of the films 104 are held. Weights 103 are preferably connected to the lower ends of films 104. The film hanger and clips form no part of the present invention and further description thereof is believed unnecessary.

The arms 71 are spaced on elevator bar 70 so that the films will be picked up and lifted from one of said tanks 31 to 35, moved laterally by the movement of bar 70 and lowered into the next adjacent tank.

Bar 70 is carried through its path by an endless chain 76, which runs about spaced vertically alined sprockets 77 and 78. Sprocket 77 is carried on a shaft 79 extending to and driven by the reducing mechanism 60. Sprocket 78 is secured to a shaft 80 journaled in a bearing 81 secured to a portion 20d2 of frame 20. See Figs. 5 and 6. A collar 82 is secured to the outer end of shaft 80 and engages bearing 81. A guide member 84 is provided to guide bar 70, and while this could take various forms, in the embodiment of the invention illustrated it is in the form of a cylindrical bar or shaft 84. Shaft 84 extends between a pair of spaced parallel arms 86 each pivoted on a vertical rod or shaft 88 having its ends disposed in frame 20 some distance from shaft 84.

A sleeve 90 is slidable on shaft 84 and has a flanged portion 90a engaging elevator bar 70 and secured thereto by bolts 91 having countersunk heads. Portion 90a has a bore 90b therein in which are disposed bushings 92. Chain 76 has a pin 94 secured thereto and projecting therefrom and disposed in a bushing 93. Chain 76 thus lifts member 90 and thus elevator bar 70 and carries the latter along through the path of chain 76.

A partition 97 extends vertically from adjacent floor 21 between tanks 33 and 34 to a line a short distance above teeth 37a, and transversely from wall 20e3 to frame wall 20c. Partition 97 extends laterally from frame portion 20e3 to rear wall 20c. Partition 97 is disposed substantially in alinement with a line passing through the centers of sprockets 77 and 78. Another partition 98 extends vertically from a line just above teeth 37a to the under surface of frame portion 20e4. Partition 98 extends laterally from frame portion 20e3 to rear wall 20c. Partition 98 is spaced from partition 97 a distance substantially equal to the distance between the runs or sides of chain 76.

Guide members 107 at each side of the machine extend from bars 37 downwardly at an angle to adjacent two members 110 formed with helical grooves on their peripheries. Members 110 are located in a dryer 112. The members 110 are rotated slowly and the film hangers and films are progressed through the dryer at the desired speed. Having only one chain 76 it was necessary to provide a stabilizing guiding means for bar 70. Bar 70 has lateral movement and it was necessary to have the guide means (which is vertical shaft or bar 84) move laterally. This was done by having bar 84 supported on swinging arms 86.

In operation, a hanger 100 with the exposed films thereon and depending from clips 101 is placed on the portion of the members 37 and 38 projecting beyond tank 31, with the ends of rod 100b disposed in the notch between teeth 37a at each side of the machine. In practice the films are transferred mechanically from a magazine (not shown). See Fig. 3. With each revolution of cam 56, arm 58 is depressed and shaft 52 is moved in a direction to lift arms 55. This movement of arms 55 lifts plates 46 through the connection made by bolts 54. As plates 46 are raised, bars 38 connected to said plates respectively are raised. As the teeth 38a on bars 38 are raised, rod 100b is lifted on the inclined surfaces of teeth 38a and rod 100b slides down said inclined surfaces to the bottom of the notch between teeth 38a. When roller 59 moves into the low portion 56a of cam 56, plates 46 and parts secured thereto including bars 38 are moved downward by gravity and arms 55 swing downwardly. When bars 38 move downwardly, rod 100b engages the inclined side of a pair of alined teeth 37a and is retained on said teeth as bar 38 descends. Rod 100b slides down on the inclined sides of teeth 37a to the bottom of the notch between teeth 37a. Rod 100b has thus been moved forward one notch on bars 37. As shaft 52 continues to rotate the above action is repeated and the hanger 100 is intermittently advanced by bars 37 and 38. Elevator bar 70 is continuously moved through its path by chain 76. As the pin 94 moves over upper sprocket 78, it carries member 90 and elevator bar 70 with it and guide bar 84 is moved laterally. As guide bar 84 is thus moved, it swings arms 86 with it. As chain pin 94 moves around the lower sprocket 79, it also carries elevator bar 70 and guide bar 84 with it, and arms 86 are swung reversely with guide bar 84.

When the film on hanger 100 reaches the end of the projecting portion of bars 37, the elevator bar 70 has moved down to its lowest position and the end bracket 71 at the left, as seen in Fig. 3, now lifts rod 100b on the hanger at the end of the projecting portion of bars 37 and said hanger and the films thereon are now lifted and moved through the path of bar 70 and lowered into the left-hand end of tank 31. Rod 100b on the lowered hanger is deposited on the bars 37 in a notch between teeth 37a. As bars 38 continue to move up and down, the hanger 100 just deposited is advanced along bars 37 until it reaches the end of tank 31 when it will be lifted by the end bracket 71 save one at the left, as seen in Fig. 3. Said hanger 100 will be lifted, progressed by bar 70 and deposited in the left-hand end of tank 32. Each successive hanger will thus be advanced on bars 37, lifted, moved and lowered into the next adjacent tank. When the films reach the end of tank 35 they will be lifted as described and placed on guide members 107. Rods 100b on the hangers will slide down guide members 107 onto members 110 and will be moved by said member through the driers.

As seen in Fig. 3, the films lifted from tank 33 will be lifted over the upper end of partition 97 and will be lowered at the right-hand side thereof, as seen in Fig. 3, and into tank 34. They will be advanced on teeth 37a and pass under the lower end of partition 98. Partitions 97 and 98 form a light shield or barrier. When reaching tank 34 the films may be exposed to light.

As shown in Fig. 4, the wall 20e1 will form a light shield and its upper terminal portion cooperates with depending portion 20d2 to block off the light coming from the right side of said left wall 20e1.

From the above description it will be seen that applicants have provided a comparatively simple compact machine which is capable of being located in a rather small space in an establishment which processes films. The various parts of the machine are conveniently assembled. The use of the movable guide for the elevator member 70 made it possible to reduce the length of the machine considerably. As described, the films are automatically moved through the machine and delivered to a drier.

It is obvious that the machine will have a high degree of utility for the purpose intended.

It will of course be understood that various changes may be made in the form, details, arrangement and proportions of the parts, without departing from the scope of applicants' invention, which, generally stated, consists in a device capable of carrying out the objects above set forth, in the parts and combinations of parts disclosed and defined in the appended claims.

What is claimed is:

1. A photographic film treating apparatus having in combination, a plurality of adjacent tanks for respectively containing film treating solutions, a vertical guide bar centrally longitudinally of said tanks at one side thereof and extending thereabove, pivotal means for supporting said guide bar adjacent said tanks, an elevator member slidably mounted on said guide bar and being formed as a cross member extending longitudinally of said tanks, a vertically disposed endless member movable through an elliptical path in a plane parallel to the plane of said elevator member, means for connecting said endless member to said elevator member whereby said elevator member is raised and lowered and moved from side to side by the movement of said endless member, a plurality of arms spaced along said elevator member and extending outwardly therefrom across said tanks, a plurality of rods adapted to extend across said tanks, a plurality of film hangers spaced along each of said rods for holding film strips in depending position for dipping into said tanks, means at either side of said tanks for supporting said rods and progressing the same longitudinally of said tanks, means on said arms adapted to pick up said rods from and deposit them onto said means in lifting and moving said rods and the film strips depending therefrom from one tank to another, and means for actuating said means at either side of said tank.

2. A photographic film treating apparatus having in combination, a frame, a plurality of adjacent tanks associated with said frame for respectively containing film treating solutions, a vertical guide bar at one side of said tanks and extending thereabove, a pair of vertically spaced arms secured to said frame for pivotally supporting said guide bar, an elevator member slidably mounted on said guide bar and extending longitudinally of said tanks, an endless member movable through a vertically disposed elliptical path in a plane parallel to the plane of said elevator member, means carried by said frame for supporting and driving said endless member, means for connecting said endless member to said elevator member whereby said elevator member may be moved upwardly and downwardly and reciprocated sideways by the movement of said endless member, a plurality of arms spaced along said elevator member and extending outwardly therefrom across said tanks, said arms being respectively positioned to be reciprocated by said elevator member across the points of the adjoining walls of said tanks, a plurality of rods adapted to extend across said tanks, a plurality of film hangers spaced along each of said rods for respectively holding film strips in depending position for dipping into said tanks, means at either side of said tanks longitudinally thereof for supporting said rods and progressing the same along said tanks, means on said arms respectively for picking up and depositing said rods onto said last mentioned means in lifting and moving said rods from one tank to another, and means for actuating said means longitudinally of said tanks.

3. The structure set forth in claim 2, said arms respectively having longitudinally spaced terminal portions having V-shaped recesses therein for picking up and depositing said rods.

4. A photographic film treating apparatus having in combination, a frame, a plurality of adjacent tanks associated with said frame for respectively containing film treating solutions, a vertical guide bar at one side of said tanks and extending thereabove, means secured to said frame for pivotally supporting said guide bar, an elevator member slidably mounted on said guide bar and extending longitudinally of said tanks, a vertically disposed endless chain movable through an elliptical path in a plane parallel to the plane of said elevator member and extending from a point somewhat below the top of said tanks to a point substantially thereabove, means carried by said frame for supporting and driving said endless member, means for connecting said endless member to said elevator member, a plurality of arms extending outwardly from said elevator member across said tanks and being respectively secured to said elevator member at points in vertical alignment with the points of adjacent walls of said tanks, a plurality of rods adapted to extend across said tanks, a plurality of film hangers spaced along each of said rods for holding film strips in depending position for dipping into said tanks, means at either side of said tanks longitudinally thereof for supporting said rods and progressing the same along said tanks, spaced terminal portions on said arms carried by said elevator member adapted to pick up said rods and deposit the same onto said last mentioned means for moving said rods and film strips depending therefrom from one tank to another, and means for actuating said means longitudinally of said tanks.

References Cited in the file of this patent

UNITED STATES PATENTS

| | | |
|---|---|---|
| 1,233,109 | Nesbit | July 10, 1917 |
| 2,459,509 | Dye et al. | Jan. 18, 1949 |